V. G. APPLE.
ELECTRIC MOTOR.
APPLICATION FILED AUG. 6, 1919.
1,407,508.
Patented Feb. 21, 1922.
3 SHEETS—SHEET 1.
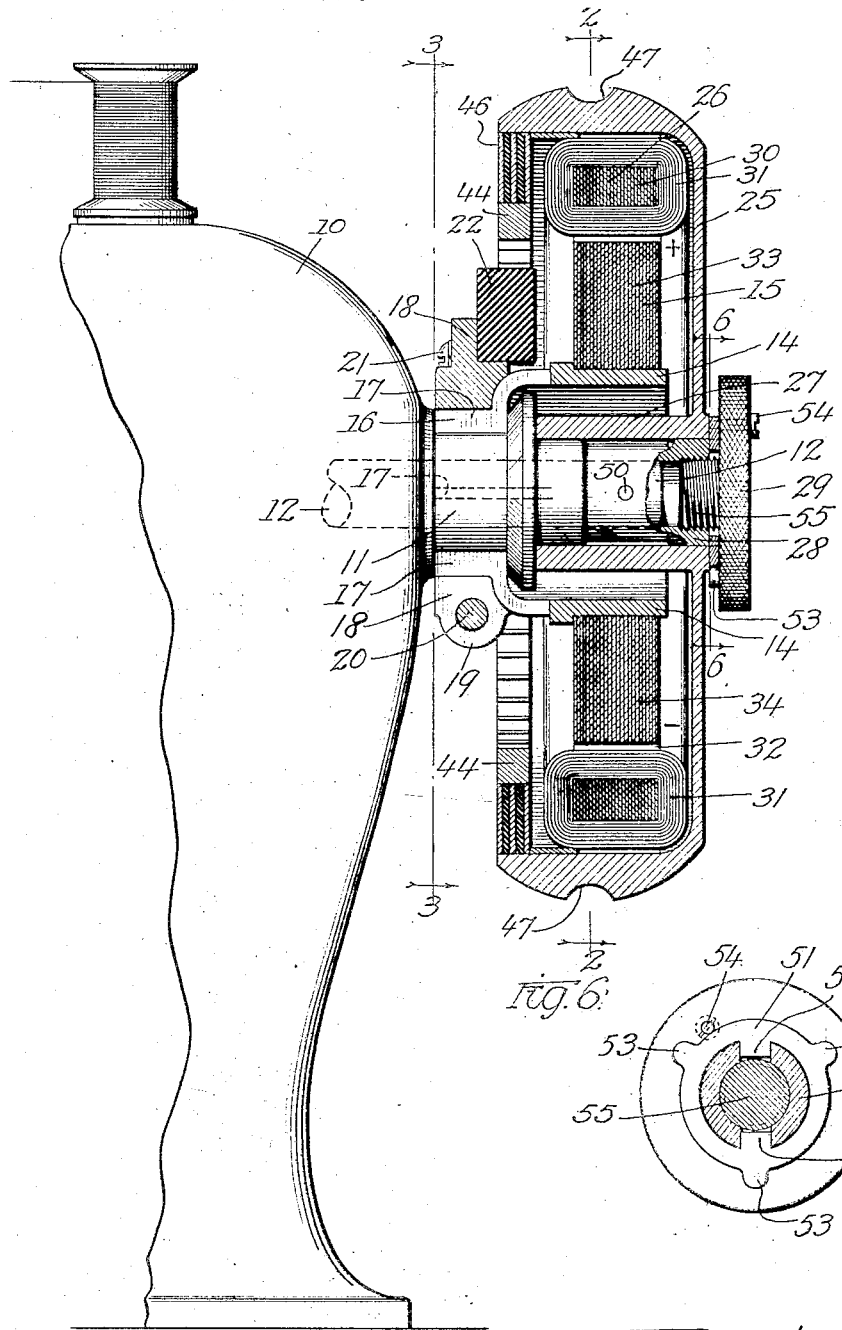
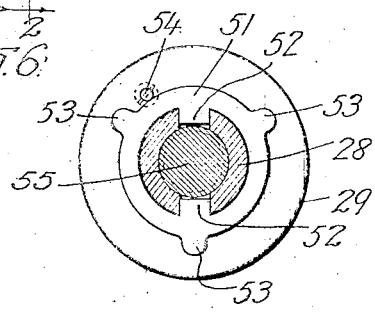
Inventor
Vincent G. Apple
Forée Bain
Atty.

V. G. APPLE.
ELECTRIC MOTOR.
APPLICATION FILED AUG. 6, 1919.

1,407,508.

Patented Feb. 21, 1922.
3 SHEETS—SHEET 3.

Inventor
Vincent G. Apple
Atty.

UNITED STATES PATENT OFFICE.

VINCENT G. APPLE, OF DAYTON, OHIO.

ELECTRIC MOTOR.

1,407,508.   Specification of Letters Patent.   Patented Feb. 21, 1922.

Application filed August 6, 1919. Serial No. 315,771.

*To all whom it may concern:*

Be it known that I, VINCENT G. APPLE, a citizen of the United States, residing at Dayton, in the county of Montgomery and State of Ohio, have invented certain new and useful Improvements in Electric Motors, of which the following is a specification.

The invention relates to improvements in electric motors and has especial reference to motors for sewing machines and means for mounting them on the driven shaft of such machines.

One of the objects of the invention is to generally improve devices of the aforesaid character.

Another and more specific object is to provide a convenient means of utilizing the pre-existing clutch on sewing machines, which is employed for connecting the usual fly wheel to the driven shaft of the machine, and which I employ for connecting my especially designed motor to the machine, by means of which the motor may be disconnected from the machine, and operated independently thereof, to wind bobbins, or for doing other useful work, such for example, as driving knitting machines, fans, churns, and the like.

Other, further and more specific objects of my invention will become readily apparent, to persons skilled in the art, from a consideration of the following description when taken in conjunction with the drawings, wherein:—

Fig. 1 is a diametric section of the motor and clutch showing it mounted on the sewing machine.

Fig. 6 is a section taken on line 6—6 of Fig. 1.

In all the views the same reference characters are employed to indicate similar parts.

Figure 2:
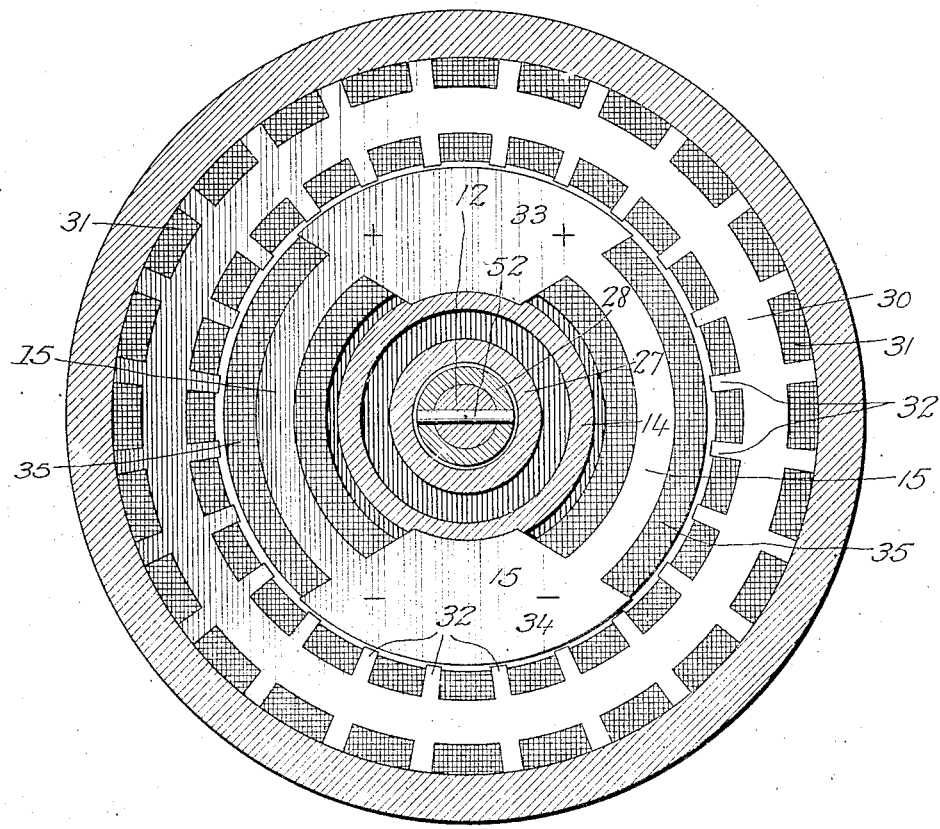
Fig. 2 is a section taken on line 2—2 of Fig. 1.
Figure 4:
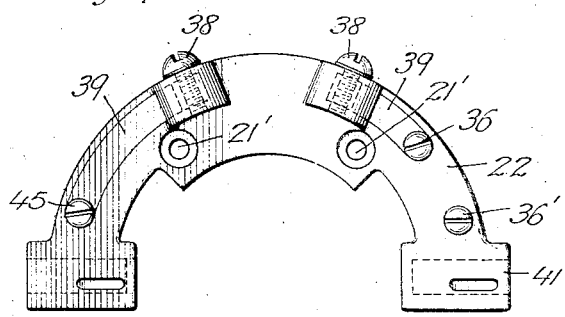
Fig. 4 is a side elevation of the brush holder.
Figure 5:
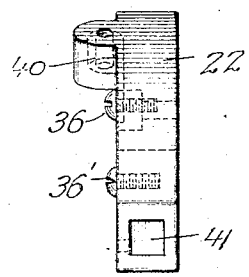
Fig. 5 is an end elevation of the brush holder.

In the embodiment illustrated, 10 is the frame portion of a sewing machine of standard type, having a rearwardly projecting hub 11, through which the driving shaft 12 passes.

A rotatably adjustable, axially fixed hub 14, for supporting the laminæ of the field magnet 15, is provided with a rearwardly extending smaller end 16 that neatly overlies the outwardly extending fixed hub 11 of the machine. The hub 14 is split, as at 17, in two diametric planes, at substantial right angles so that it may be compressed by the overlying clamping ring 18, which is also split, as at 19, and adapted to be contracted by the screw 20, so that the field magnet may be moved about the shaft 12, to adjust it, and secured in selected position by the clamping ring 18. Secured to the clamping ring 18, by screws 21, is a brush holder 22, made preferably of molded bakelite or other material similar to phenolic condensation products. The ring 18 is provided with an integral segment 23, extending radially therefrom, through which the screws 21 pass for securing the brush holder in place thereon. The brush holder 22 may also be moved around the shaft 12 on the hub 16, and secured in selected position by the screw 20, without disturbing the position of the field 15, to produce proper commutation. The inner field magnet structure and the brush holder are therefore made rotatably adjustable and axially stationary on the frame of the machine, by this means.

A shell 25, for supporting the structure 26, is provided with a bearing hub 27 that neatly fits over a clutch sleeve 28. The clutch sleeve is a standard part of the sewing machine of this type, used for connecting the usual fly wheel thereof to the shaft 12 of the sewing machine. When the armature rotates independently of the shaft 12, it rotates from this sleeve and when it is desired to connect the armature to the shaft 12, it is only necessary to turn the thumb nut 29 to connect the sleeve 28 with the bearing hub 27 of the armature. The armature shell 25 may be made of bakelite, or the like, or it may be die cast of suitable non-magnetic metal and the armature 26, secured therein by any suitable means. The core laminæ 30 of the armature are shown more specifically in Fig. 2, and are wound about with the usual conducting coils 31, at suitable intervals. The armature core may have inwardly directed polar extensions 32 for close proximity to the pole pieces 33 and 34 of the field magnet. The field magnet is composed of a series of stacked laminæ 15, wound about with suitable coils 35, the terminals of which are connected to screws 36—36' of the brush holder and screws 36 and 45 are connected to the main terminals 38, respectively, by embedded metal pieces 39 which are molded in the body of the brush holder 22. The screws 38 are threaded directly into enlarged ends 40 of the metal strips 39 and these heads are embedded in the body portion of the brush holder. The brush has at diametrically opposite ends, brush-enclosing mortises 41 within which the brushes 42 are slidably mounted, held yieldingly by springs 43, against the inner face of the commutator 44.

Figure 3:
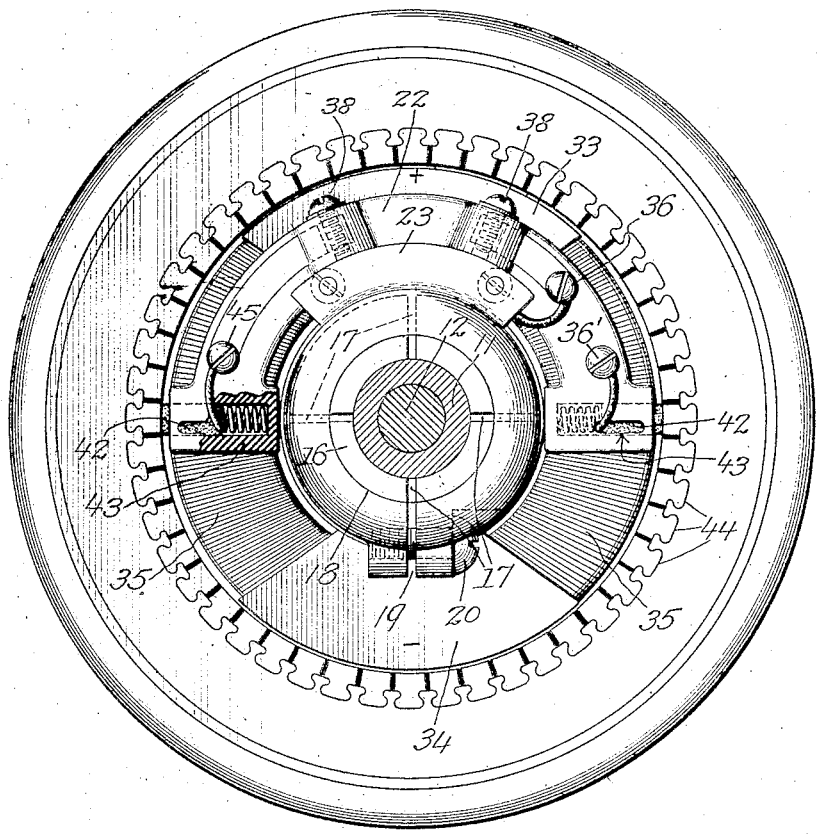
Fig. 3 is a section taken on line 3—3 of Fig. 1.
Figure 7:
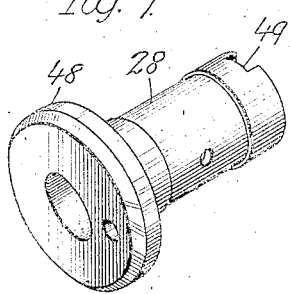
Fig. 7 is a perspective view of the clutch sleeve upon which the armature of the motor is mounted.
Figure 8:
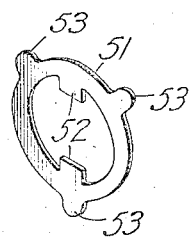
Fig. 8 is a ring or plate for connecting the armature to a shaft of the machine.

When the armature and the field magnet are connected in series in the circuit, the terminals of the field magnet coils may be connected to the screws 36, 36', whereas if the armature and field magnets are to be connected in parallel circuit the terminals of the field magnet are attached to the screws 36' and 45 and 36 and 36' are connected together. In Fig. 3, the field magnet and the armature are shown to be connected in series, by this arrangement.

The field magnet laminations 15 have their pole pieces 33 and 34 directly secured to the hub 14. The laminations 15 are self supporting, that is to say, they are cemented together so as not to require any other support, after which they may be bored through and forced upon the non-magnetic hub 14, as a means for holding the field structure firmly in place.

The commutator 44 consisting of a series of spaced apart bars, held together by an insulating ring which is composed, preferably, of bakelite and fabric 46 and is suitably secured in the armature shell 25, by any means that will properly support it therein.

The outer peripheral surface of the armature shell 25 is preferably grooved, as at 47, in which groove a belt may be attached when it is desired to operate machinery other than the sewing machine, upon which the motor is mounted.

The bearing hub 27 of the armature takes the place of the hub of the ordinary fly wheel and is mounted upon the standard clutch sleeve 28. The clutch sleeve 28 is provided with a head 48 and on its smaller end it is provided with a transversely extending notch 49 and it is keyed to the shaft 12 by a pin 50 so that it is at all times rotatable with the shaft. The plate or ring 51 has inwardly extending parts 52 that are received in the groove 49 of the sleeve 28.

The plate 51 is provided with spaced apart ears 53 that are within the circumferentially movable path of the screw 54, which extends through the thumb nut 29, and these ears serve to limit the rotation of the thumb nut between two adjacent ears. The thumb nut has an inwardly projecting threaded hub 55 which screws into the open threaded end of the sleeve 28. When the thumb nut 29 is screwed tightly into the end of the sleeve 28, it causes the plate 51 to bear with considerable frictional resistance upon the end of the hub 27 and causes the inner end of the hub 27 to bear with frictional contact against the inner surface of the head 48, on the sleeve 28, thereby completing driving connection between the shaft 12 and the armature shell 25, so that when the armature is rotated, about the field magnet, the shaft 12 is driven directly thereby. When the thumb nut 29 is moved, so that the inner projecting end of the screw 54 is in contact with one of the ears 53, or near to a given ear, sufficient friction will have been exerted upon these parts to cause completion of the driving connection, and when the thumb nut 29 is moved in the opposite direction, by the hand of the operator for the purpose of disconnecting the parts, the adjacent ear 53 limits its rotative movement and prevents removal of the nut, which, however, is sufficient for the purpose, before the screw 54 reaches the adjacent ear.

When it becomes necessary to remove the parts, the screw 54 may be taken from the nut, whereupon the nut may be screwed so that the hub 55 will leave the end of the sleeve 28, after which the armature and shell may be removed from the sleeve, and when the pin 50 is removed, the entire motor structure may be taken from the supporting shaft 12.

Having described my invention, what I claim is:—

In a device of the character described a fixed hub; a shaft rotatable therein and projecting therebeyond in combination with a cup-shape member supporting a motor element and having a split ring part overlying said hub and rotatable thereon, a clamping ring overlying the split ring part of the cup-shape member and rotatable thereon; a brush holder mounted on the clamping ring and means to contact both said rings to independently adjust and fix the motor element and the brush holder to the fixed hub.

In testimony whereof I hereunto subscribed my name.

VINCENT G. APPLE.